3,203,834
FUEL CELL

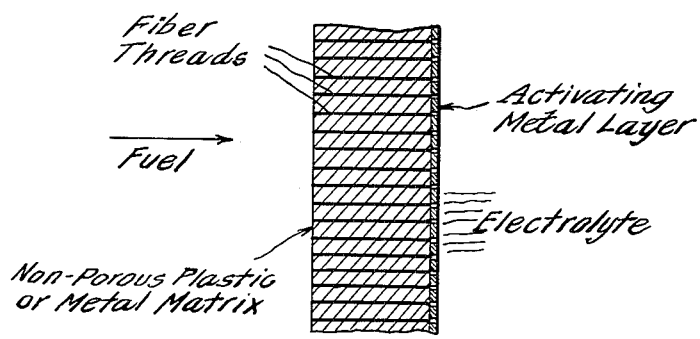

Alfred W. Breiner, Arlington, Va., assignor to Leesona Corporation, Cranston, R.I., a corporation of Massachusetts
Filed July 26, 1961, Ser. No. 126,997
6 Claims. (Cl. 136—86)

This invention relates to improved fuel cell electrodes and more particularly to substantially non-porous electrode structures containing threads, fibers or a similar material extending from one surface of the structure to the second surface, thereby permitting liquid and gaseous fuels and/or oxidants to pass through the structure in controlled amounts.

As employed in the instant specification, the term "fuel cell" denotes a cell which in its simplest form comprises a housing, a fuel electrode, an oxidizing electrode and an electrolyte. Electrical energy is formed in the cell directly through the electrochemical oxidation of the fuel. In the prior art, fuel cell electrodes have generally consisted of microporous structures (pore sizes ranging from about one to about 100 microns) which are electrically conducting and electrochemically active. These electrodes permit the establishment of an interface of the fuel or oxidant, i.e., a gas or liquid feed, solid active electrode and ionic electrolyte either by a difference in the structure such as the use of a dual porosity layer or by contacting the electrode interface with a matrix retaining the electrolyte. At the interface, the fuel or oxygen is chemisorbed; ion exchange taking place through the electrically conducting electrode. The electrical charge is drained from the electrodes through an external circuit and the fuel ions react with the oxidizing ions to form a neutral product.

A major problem in the construction of an efficient fuel cell is a practical means of controlling the fuel flow through the electrode structure. When, for example, a homoporous nickel or carbon plate is employed, it is necessary to carefully adjust the differential pressure across the cell and employ plates which have uniform pore openings in order to regulate the interface. Thus, carefully fractionated metal or carbon powders are required in producing the porous plate. However, it is practically impossible to obtain completely uniform pore openings in a cell, and the cell necessarily operates with some of the smaller pore openings flooded with electrolyte or else fuel bubbles through the electrode into the electrolyte unconsumed. The latter feature is detrimental both in that fuel is wasted and since the unconsumed fuel may contaminate the electrolyte.

The above disadvantages, inherent in a mono-porous structure, were overcome to a large extent by the introduction of the bi-porous electrode where large pores front the fuel gas side of the electrode and smaller pores face the electrolyte. However, these electrodes are not the complete answer at least from a commercial standpoint, due to their high cost of manufacture which necessitates the use of carefully fractionated carbon or metal particles. Further, where a liquid fuel is employed, the bi-porous system is not completely acceptable.

Accordingly, it is an object of the instant invention to provide a fuel cell electrode which will permit control of gaseous and liquid feeds.

It is another object of the instant invention to provide a fuel cell electrode which is electrochemically stable, yet inexpensive to manufacture.

It is another object of this invention to provide an electrode which has a catalytically activated surface.

These and other objects of the invention will become more apparent from the following detailed description with particular emphasis upon the illustrative examples.

In general, the improved electrodes of the instant invention are plastic or metallic structures having fibrous or similar materials embedded therein and extending from surface to surface. The fibrous material permits gases or liquids to "flow" or migrate by capillary or osmotic action from one surface of the structure to the other. Thus, a substantially non-porous polyethylene polymer layer embedded with cotton threads and activated on one surface can be employed as the fuel electrode in a fuel cell. A fuel such as ethyl alcohol is caused to contact one surface of the electrode and permitted to "flow" to the second surface fronting the electrolyte where an electrochemical reaction will occur. As is apparent, fuel will be freely transported across the electrode structure primarily as a function of current demand. The particular type of fiber employed, as well as by the number of fibers embedded in the structure will also be a factor.

Structures suitable for incorporating the fibrous materials can be metal sheets or, preferably, organic polymeric materials. When a polymeric material is employed, it is necessary to coat the surface fronting the electrolyte with a catalytic metal to obtain efficient reaction. It may be necessary to employ a metal screen to serve as a conductor of electrical energy. When a metal structure is selected, it is not completely necessary to activate the surface, although it may be desirable at times to obtain more efficient reaction with a specific fuel.

Plastics suitable for use herein are the substantially non-porous polymeric substances, either hydrophilic or hydrophobic in nature, such as polyethylene, polyurethanes, polypropylene, polyvinyl chloride, polyvinylidene chloride, epoxy resins, such as diglycidyl 4,4 bis(4 hydroxyphenyl)propane and the higher molecular weight epoxides which are the reaction products of bisphenol A and epichlorohydrin, polymethacrylates, polyacrylates, polyvinyl alcohol, polyvinyl nitrile, nylon, styrenated alkyd resins and the like. Virtually any polymeric plastic material can be employed which is capable of forming a substantially solid matrix and is relatively insensitive to the substances in which the matrix will be in contact.

Other materials which can be employed to retain the fibrous materials and form a part of the present electrode structures are the malleable and ductile metals such as nickel, copper, silver, palladium, platinum, palladium-silver alloys, gold, etc. Depending upon the metal used, it may be unnecessary to activate the electrode surface before use.

The fibrous or similar materials embedded in the plastic or metal structures can be virtually any filament as long as it will permit the passage of a gas or liquid by capillary or osmotic action. Operable fibers include the natural textile fibers such as cotton and wool; the synthetic materials including rayon, nylon, fibers prepared from cellulose nitrate, cellulose acetate, etc. The filaments are suitable as single strands or as woven or twisted materials. The control of the fuel or oxidant feed is governed by the nature of the material employed, the diameter of the fiber and the number of fibers in the matrices. Although, depending on the application of the fuel cell, the size and number of fibers employed will vary over a relatively wide range, preferably the fibers embedded in the matrix have a diameter of from about one to about 100 microns and will account for about 15–85% of the total electrode area. However, it has been found that fibers having a diameter of from about one to about 10 microns are particularly suitable with the final structure having about 35–80% of the surface area made up of the fibrous material. Improved control of the gas passage is usually obtained where the diameter of the fiber is small and the number of fibers is large.

When the electrode is composed of fibrous materials embedded in a plastic diaphragm, it is necessary that the surface of the electrode which is to front the electrolyte be coated with an electrically conductive catalytic layer. Suitable catalytic layers which are used to coat the polymer are pure elements, alloys, oxides or mixtures thereof, belonging to groups IB, IIB, IV, V, VI, VII and VIII of Mendelyeev's Periodic Table, and the rare earth elements. The proper selection of a suitable catalyst depends to a large extent upon the fuel employed in the fuel cell, or whether the structure is to be used as the oxidant electrode. Thus, it has been found that silver is particularly effective as the coating for an oxidizing electrode whereas an element of Periodic Group VIII such as nickel, rhodium, platinum, palladium, osmium, or iridium is particularly effective when carbonaceous fuels are employed. The proper selection of a catalytic metal does not form a part of the instant invention and is within the ability of one skilled in the art. The catalytic coating can be applied by conventional techniques such as chemical reduction, vacuum deposition or electrodeposition. If desired, a catalytic film can be applied in a similar manner to a metal matrix.

The instant fuel cell electrodes can be constructed by various methods. Thus, cotton or similar fibers can be arranged in substantially parallel rows in a mold and a molten polymer, such as polyethylene, cast around the fibers. The polymer is allowed to set at room temperature or by hot pressing. Alternatively, a mixture of granular polymer can be placed around the fibers, pressed, and sintered to form a substantially non-porous structure. The instant electrodes can also be formed by spraying or dipping a fibrous network with an aqueous or organic solution of polymer. The polymer can be hot pressed if desired to remove any voids. A malleable metal can be employed with suitable modifications to the methods.

The instant electrodes are operable in fuel cells using the conventional prior art electrolytes. As is well known, for an efficient fuel cell, it is necessary that the electrolyte remain substantially invariant and have a high ionic conductivity. The alkaline electrolytes such as sodium hydroxide, potassium hydroxide or the alkanolamines are particularly suitable. However, acid electrolytes such as sulphuric acid, phosphoric acid, etc. can be employed. It is necessary to exercise some care in selecting the electrolyte to make sure that it will be compatible with the polymer or metal and the fibrous material which makes up the electrode.

The instant electrodes can be employed in fuel cells operating on practically any of the prior art fuels. However, the carbonaceous fuels such as alcohols and hydrocarbons in liquid form are satisfactory. The instant invention is not restricted to a particular fuel employed in the cell, since the proper selection depends on fuels which are available and upon the electrode structure. The choice is within the ability of one skilled in the art.

The novel electrodes described herein are utilized in fuel cells operated within a relatively wide temperature range. However, for good electrochemical activity, the temperature of the system should be in the neighborhood of from about 25–300° C. As a general rule, the higher the temperature, the greater the electrochemical reaction for a given period of time with the operating temperature, to a large extent, being dependent upon the fuel employed.

Having described the invention in general terms, the drawing and the following examples are set forth to more particularly illustrate the invention. Parts are by weight unless specified otherwise.

*Example 1*

Cotton fibers having a diameter of about five microns are arranged in parallel lines in a suitable mold. Molten polyethylene is cast into the mold around the fibers. The polyethylene is allowed to solidify and thereafter hot pressed at a temperature of 80°±5° C., to remove any voids in the plastic structure. The polymer, containing the fibers embedded therein, is sliced to obtain a 15 cms. square plastic sheet about five mils in thickness. Approximately 65% of the total resultant structure is made up of embedded fiber.

*Example 2*

A fabric with a pile resulting from filament-like threads extending in substantially parallel lines, containing about 50,000 mono-filaments per square centimeter, is coated with a 50% methyl ethyl ketone solution of equivalent weight amounts of diethylene triamine and Epon 828, an epoxide marketed by the Shell Chemical Corporation which is a diglycidyl ether of one mol of 2,2 bis(4 hydroxyphenyl)propane and epichlorohydrin and has an epoxide equivalent of 192 and a melting point of 9° C. The coating is accomplished by spraying the fabric with the epoxide solution and air drying until a structure having the desired thickness is obtained. When the structure reaches a thickness of approximately eight mils, the coated fabric is allowed to harden at substantially room temperature. Approximately 65% of the area of the structure obtained is composed of fibrous material.

*Example 3*

Filaments prepared from rayon fibers having a diameter of approximately four microns are spun to obtain a loose weave. The resultant weave is sprayed with a 40% aqueous polymethacrylate emulsion to obtain a coating on the filaments of approximately one mil thickness. The loosely woven fibers are hot pressed at 80° C. to set the polymer and remove voids between the fibers. Approximately 50% of the surface area of the electrode is embedded with fibers.

*Example 4*

Fibers of polyvinyl acetate woven in random distribution are coated with a solution of molten nylon resin as described in Example 1 and pressed at a temperature of 80° C. using dielectric heat. The pressed material is sliced to obtain a cross section fifteen cms. in length and five mils thick.

In Examples 1–4, the polymer used to coat the fibers can be replaced by any material such as polystyrene, Teflon, mono-chlor-tri chlor polyethane, polypropylene, polymethyl methacrylate, polyvinylidene chloride, polyvinyl chloride, co-polymers of vinyl chloride and vinylidene chloride, polyvinyl ethyl ether, polybutadiene-styrene co-polymers, and styrenated alkyd resins. Malleable and ductile metals such as silver, gold, palladium, platinum, and copper can also be used to replace the polymer in Examples 1–4.

In Examples 1–4, the fiber which is embedded in the polymer matrix can be replaced by other filaments including fibers made from cellulose nitrate, cellulose acetate, natural bristles and synthetic bristles.

In order to more clearly illustrate the utility of the instant electrodes in a fuel cell, the structure of Example 1 is coated with a thin film of palladium-silver alloy by immersing the sheet in a solution prepared by dissolving 41 milligrams of a 25% silver and 75 palladium alloy in 10 cc. of nitric acid. Ammonium hydroxide is added to the solution to obtain a pH of 9 and the volume adjusted to 100 cc. The solution contained 10 milligrams of silver and 31 milligrams of palladium per 122 cc. The plating is carried out at a current density of 7.5 ma./cm.$^2$, a voltage of 1.9 volts and a temperature of 150° C. The anode was platinum. The deposition which is completed in approximately 80 minutes exhibits good adhesion to the polymer surface as well as good compatibiity. An analysis of the film showed the content to be 32% palladium and 68% silver. The structure used as a fuel electrode in a fuel cell exhibits good electrochemical properties.

While various embodiments of the instant invention are described, it should be appreciated that the invention is not restricted thereto and are not intended to cover all modifications of the invention which will be apparent to one skilled in the art and which come within the scope of the appended claims.

It is desired and claimed to be secured by Letters Patent:

1. A fuel cell for the generation of electrical current directly from a fuel and oxidant comprising an electrolyte, at least one conductive oxidizing electrode, at least one conductive fuel electrode, said electrodes being in contact with said electrolyte, and means for providing fuel cell reactants to said electrodes including reactant compartments, at least one of said electrodes comprising a substantially non-porous matrix having a fibrous material pervious to gases and liquids extending from major surface to major surface thereof, said fibrous material being in contact with said electrolyte and a reactant compartment, said non-porous matrix being selected from the group consisting of plastic and malleable metals.

2. The fuel cell of claim 1 wherein said non-porous matrix is metal.

3. The fuel cell of claim 1 wherein said non-porous matrix is plastic and is in contact with a conductive metal layer.

4. The fuel cell of claim 3 wherein the conductive metal layer is a metallic grid.

5. The fuel cell of claim 1 wherein each fiber has a diameter of from about 1 micron to about 100 microns with said fibers comprising about 15 to 85 percent of the total electrode area.

6. The fuel cell electrode of claim 5 wherein the fibrous material is cotton.

References Cited by the Examiner
UNITED STATES PATENTS

| | | | |
|---|---|---|---|
| 1,502,455 | 7/24 | Wood | 136—146 |
| 1,831,406 | 11/31 | Beckman | 136—146 |
| 2,384,463 | 9/45 | Gunn et al. | 136—86 |
| 2,713,550 | 7/55 | Reid et al. | 136—86 |
| 2,773,561 | 12/56 | Hunter | 136—86 |
| 2,860,175 | 11/58 | Justi | 136—86 |
| 3,057,943 | 10/62 | Strauss | 136—6 |

JOHN H. MACK, *Primary Examiner.*

JOHN R. SPECK, *Examiner.*